United States Patent
Knaack et al.

[11] Patent Number: 5,872,802
[45] Date of Patent: *Feb. 16, 1999

[54] PARITY GENERATION AND CHECK CIRCUIT AND METHOD IN READ DATA PATH

[75] Inventors: Roland T. Knaack; Brian P. Evans, both of Starkville, Miss.

[73] Assignee: Cypress Semiconductor Corp., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 642,777

[22] Filed: May 3, 1996

[51] Int. Cl.$^6$ .................................................. G06F 11/00
[52] U.S. Cl. ...................... 371/49.1; 371/21.1; 365/201; 395/185.05
[58] Field of Search ................................ 371/49.1, 49.2, 371/49.4, 48, 67.1, 21.1, 21.2, 24, 25.1, 71; 365/200, 201; 364/265.3, 266.3, 266.4, 945.6; 395/185.05, 185.07, 182.04, 183.18

[56] References Cited

U.S. PATENT DOCUMENTS

| | | | |
|---|---|---|---|
| 4,604,727 | 8/1986 | Shah | 365/200 |
| 4,802,122 | 1/1989 | Auvinen et al. | 365/154 |
| 4,839,866 | 6/1989 | Ward et al. | 365/221 |
| 4,875,196 | 10/1989 | Spaderna et al. | 365/238 |
| 4,891,788 | 1/1990 | Kreifels | 365/49 |
| 4,901,320 | 2/1990 | Sawada et al. | 371/49.1 |
| 5,084,837 | 1/1992 | Matsumoto et al. | 395/250 |
| 5,088,061 | 2/1992 | Golnabi et al. | 365/189.01 |
| 5,228,002 | 7/1993 | Huang | 365/221 |
| 5,262,996 | 11/1993 | Shiue | 362/221 |
| 5,305,253 | 4/1994 | Ward | 365/73 |
| 5,311,475 | 5/1994 | Huang | 365/221 |
| 5,317,756 | 5/1994 | Komatsu et al. | 395/800 |
| 5,349,683 | 9/1994 | Wu et al. | 371/49.2 |
| 5,367,486 | 11/1994 | Mori et al. | 365/189.05 |
| 5,404,332 | 4/1995 | Sato et al. | 365/201 |
| 5,406,273 | 4/1995 | Nishida et al. | 340/825.51 |
| 5,406,554 | 4/1995 | Parry | 370/58.1 |
| 5,424,989 | 6/1995 | Hagiwara et al. | 365/201 |
| 5,426,612 | 6/1995 | Ichige et al. | 365/220 |
| 5,428,575 | 6/1995 | Fudeyasu | 365/201 |
| 5,450,424 | 9/1995 | Okugaki et al. | 371/40.1 |
| 5,467,319 | 11/1995 | Nusinov et al. | 365/231 |
| 5,469,450 | 11/1995 | Cho | 371/40.4 |
| 5,490,257 | 2/1996 | Hoberman et al. | 395/427 |
| 5,506,809 | 4/1996 | Csoppenszky et al. | 365/221 |
| 5,513,318 | 4/1996 | van de Goor et al. | 395/185.01 |
| 5,521,876 | 5/1996 | Hattori et al. | 365/221 |
| 5,546,347 | 8/1996 | Ko et al. | 365/221 |

FOREIGN PATENT DOCUMENTS

| | | |
|---|---|---|
| 0113996 | 8/1989 | Japan . |
| 0676559 | 6/1994 | Japan . |

*Primary Examiner*—Trinh L. Tu
*Attorney, Agent, or Firm*—Maiorana & Acosta, P.C.; Christopher P. Maiorana

[57] ABSTRACT

The present invention provides a circuit and method for generating a parity bit and checking the parity of data words positioned in the read data path of a memory device or buffer. The parity check mode can detect errors. The parity generation mode generates EVEN or ODD parity as an additional bit. Other devices in the system may generally be configured to accept either EVEN or ODD parity. The parity generation and checking circuit can detect errors in both the data input to the buffer as well as errors created in the storage of the data by the buffer.

20 Claims, 7 Drawing Sheets

PARITY GENERATION AND CHECK CIRCUIT AND METHOD IN READ DATA PATH

FIELD OF THE INVENTION

The present invention relates to parity generation and checking generally and, more particularly, to a parity generation and checking circuit and method positioned in a read data path of a memory buffer.

BACKGROUND OF THE INVENTION

Parity generation provides a simple means for detecting errors in both data recording and data transmission. A data quantity may be allocated a parity bit having a value which may be computed from the various bits of the data. A parity bit may be generated from the various bits of the data being read. The data can have even or odd parity and the parity bit will be responsible for making the data and parity bit be even or odd based on user input. The parity bit designates whether or not a transmitted character, or data packet, has arrived correctly. During parity checking, if the device is configured to always have even parity, the parity checking feature will indicate a parity error if odd parity is received. On existing first-in first-out (FIFO) buffers, the parity generation and checking circuitry may be located in the write data path of the integrated circuit or chip. As memory devices generally, and FIFO devices particularly, provide additional access speeds and more efficient real estate utilization, the parity generation and checking circuitry in the write data path can slow down the performance of the device.

SUMMARY OF THE INVENTION

The present invention provides a circuit and method for generation of a parity bit that may be positioned in the read data path of a memory device or buffer. The present invention also provides for checking the data bits for a specified parity (e.g., odd or even) and indicating an error if appropriate. The parity generation and checking circuit can detect errors in both the data input to the buffer or memory device as well as errors created in the storage of the data by the buffer or memory device. By placing the parity generation and checking circuitry in the read path, a look-ahead architecture can increase the overall performance of the buffer or memory device.

The objects, features and advantages of the present invention include providing a parity generation and checking circuit positioned in the read data path of a memory device or buffer. The circuit may reduce die size and may reduce data set-up and hold time. The circuit also provides the ability to check the integrity of the memory core of the buffer.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
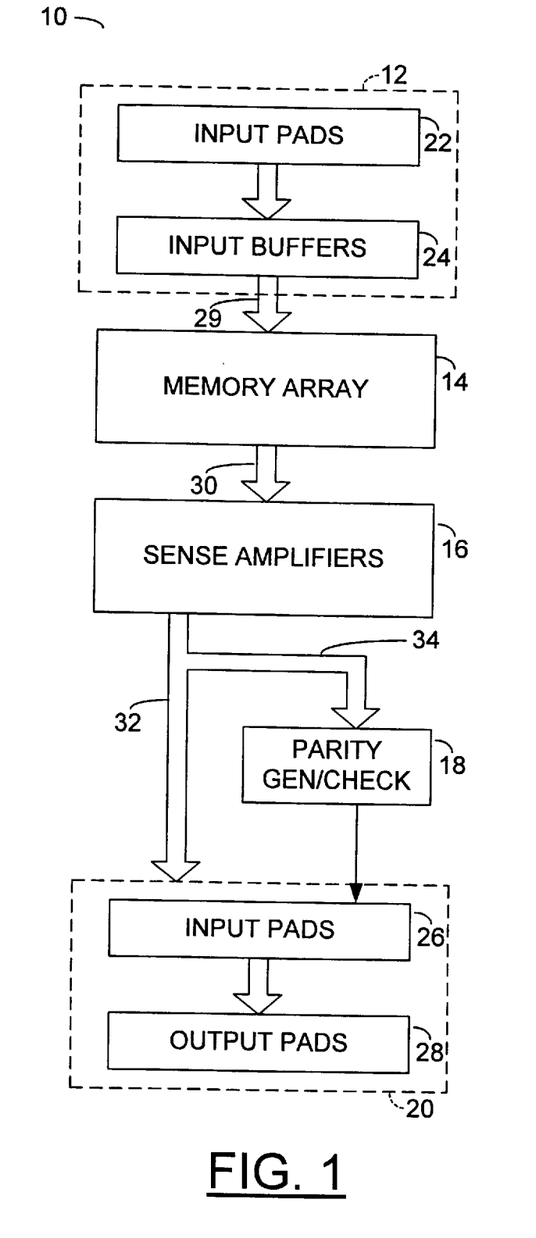
FIG. 1 is a block diagram of the parity generation and checking circuit of a preferred embodiment of the present invention.

Referring to FIG. 1, a block diagram of a circuit 10 is shown in accordance with a preferred embodiment of the present invention. The circuit 10 comprises an input section 12, a memory array 14, a sense amplifier block 16, a parity generation/check block 18 and an output section 20. The input section 12 receives data from an external device (not shown) and presents the data to the memory array 14. The memory 14 stores the data and then presents the data to the sense amplifier block 16. The sense amplifier block 16, which acts as output device or means for reading data from the memory array can also be implemented as a latch or any other device that provides the equivalent function(s) of sensing and/or amplifying an electrical potential. The parity generation/check block 18 receives data from the sense amplifier block 16 and presents data to the output section 20.

Since the parity generation/check block 18, in one example, may be placed after the memory array 14, errors can be detected which may be created from both the input data as well as from the memory array 14. Both the validity of the incoming data as well as the validity of the data stored in the memory array 14 may be determined by the parity generation/check block 18. The parity generation/check block 18 does not distinguish whether the error came from the incoming data or the memory array 14.

The memory array 14 can be a first-in first-out (FIFO) buffer, a static random access memory (SRAM), a content addressable memory (CAM), a CACHE memory, a dynamic random access memory (DRAM), a TAG memory, a dual port memory or any other type of memory array.

The data input section 12 generally comprises a set of input pads 22 and a set of input buffers 24. The input buffers 24 provide an additional layer of buffering prior to the memory array 14. The output section 20 generally comprises a set of output buffers 26 and a set of output pads 28. The output buffers 26 provide an additional layer of buffering between the memory array 14 and the external device.

The data input section 12 presents data received from an external device to the memory array 14 through a bus 29. The bus 29 may be a multi-bit bus which presents data to the memory array 14. In one example, the bus 29 may be a 9-bit bus. However, other width busses may be used to implement the bus 29. The memory array 14 presents data to sense amplifier block 16 through a bus 30. The sense amplifier 16 presents data through a bus 32 directly to the data output section 20. The sense amplifier 16 presents data to the parity generation/check section 18 through a bus 34. The bus 34, in one example, may have the same or different width as bus 32 (see for example, U.S. Ser. No. 08/624,182, filed Mar. 29, 1996, Attorney Docket No. 16820.P133) The bus 34 may be 1-bit smaller than bus 32 since there may be either a generation of a parity bit or the checking of parity from the Gen/check block 18. There may be some multiplexing between an operation producing 9-bits of data and an operation producing 8-bits of data and the parity check bit to the output section 20.

Since the parity generation/check block 18 may be located after the memory array 14, any errors received from the memory array 14 may be detected by the parity generation/ check block 18. If the data received by the data input section 12 creates an error or the data received from the memory array 14 creates an error, the parity generation/check block 18 may detect the error. This provides the advantage of having a single parity generation/check block 18 which may detect errors from multiple sources. Furthermore, the chip real estate necessary to implement the parity generation/ check block 18 after the memory array 14 may be available on the currently produced dies in an unused portion of the silicon.

Figure 2:
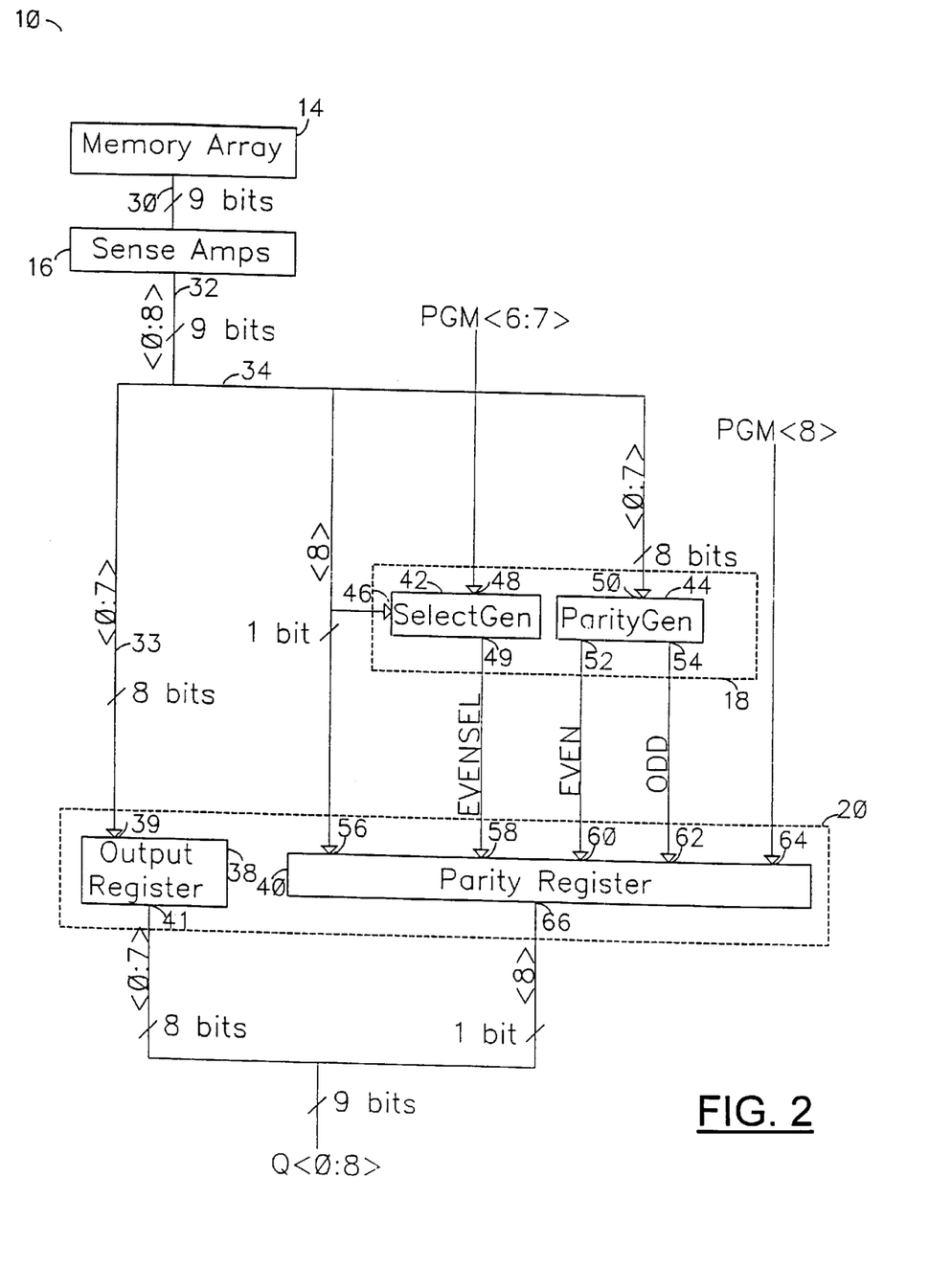
FIG. 2 is a more detailed block diagram of the preferred embodiment of the present invention.

Referring to FIG. 2, a more detailed block diagram of the circuit 10 is shown. The data output section 20 generally comprises a output register 38 and a parity register 40. The output register 38 has an input 39 which (if eight bits wide) may receive the first eight bits (i.e., <0:7>) of the data packet received from the bus 33. The output register 38 presents a signal at the output 41 which represents the signal received at the input 39.

The parity generation/check block 18 comprises a Select-Gen block 42 and a ParityGen block 44. The SelectGen block 42 has an input 46 which receives the ninth bit (i.e., <8>) of the data received on the multi-bit bus 34. The SelectGen block 42 also has an input 48 which receives two bits (i.e., PGM <6:7>) of a three bit configuration signal PGM. The SelectGen block 42 presents a signal EVENSEL through the output 49 to the parity register 40. The Parity-Gen block 44 has an input 50 which also receives the first eight bits (i.e., <0:7>) of the data received on the bus 34, similar to the data received at the input 39 of the output register. The ParityGen block 44 presents a signal ODD at an output 54 and a signal EVEN at an output 52.

The parity register 40 has an input 56 which may receive the ninth bit (i.e., <8>) of data received on the bus 34, an input 58 which may receive the signal EVENSEL from the SelectGen block 42, an input 60 which may receive the signal EVEN from the ParityGen block 44, an input 62 which may receive the signal ODD from the ParityGen block 44 and an input 64 which may receive a third bit (i.e., PGM <8>) of the three bit configuration signal PGM. The parity register 40 has an output 66 which may present a single-bit output signal which may be either a parity generation bit, a parity error bit or the ninth bit of data. The output 66 and the output 41 are combined to form an output Q which represents the eight data bits <0:7> and the one bit from the parity register <8> to form a nine bit signal Q <0:8>.

The PGM input 48 and the PGM input 64 work in combination to form the three-bit configuration signal PGM which may be used to generate various parity options such as parity disabled, generate even parity, generate odd parity, check for even parity and check for odd parity. The PGM inputs 48 and 64 configure the circuit according to the following TABLE 1:

TABLE 1

Programmable parity Options

| PGM8 | PGM7 | PGM6 | Condition |
| --- | --- | --- | --- |
| 0 | X | X | Parity disabled. |
| 1 | 0 | 0 | Generate even parity at output 66. |
| 1 | 0 | 1 | Generate odd parity at output 66. |
| 1 | 1 | 0 | Check for even parity. Indicate error at output 66 if odd parity found. |
| 1 | 1 | 1 | Check for odd parity. Indicate error at output 66 if even parity found. |

The configuration signal PGM may be programmed using various methods including, for example, programming during a master reset cycle, programming a register by a user providing a specific program sequence (e.g., a write program register instruction or an execution) or providing a write program register cycle which the user can use to dynamically change the program register. Metal options may be implemented on the die so that the fabrication process allows for specific dies that are either configured to be parity disabled, generate even or odd parity or check for even or odd parity. The configuration signal PGM can be generated by allowing the user to dynamically specify which mode to operate in. The configuration signal PGM may have dedicated pins on the output of the package, (e.g., PGM 6, 7 and 8) that are externally presented allowing a static signal to be presented at all times as shown in TABLE 1. A high voltage detection could also be implemented to generate the configuration signal PGM. Other means to provide the configuration signal PGM may be used according to the design criteria of a particular application.

In a mode when the parity may be disabled, the memory array 14 may store 9-bits of data received from the data input section 12 internally and may output 9-bits to the data output section 20.

When the configuration signal PGM selects even parity, the ninth bit is preferably a 1 if there are an odd number of 1's in <0:7> or a 0 if there are an even number of 1's in <0:7>. When the configuration signal PGM signal selects an ODD parity gen, the ninth bit is preferably a 1 if there are an even number of 1's in <0:7> or a 0 if there are an odd number of 1's in <0:7>.

The circuit 10 may be programmed for parity checking which may allow the circuit to compare the parity of the bits <0:8> with even or odd parity as selected by parity configuration signal PGM. When these words are later read, the output 66 may reflect the result of the parity check. If a parity error occurs in the bits <0:8>, the parity error bit <8> may be set LOW internally. When this word is read, the ninth bit <8> will preferably indicate the results of the parity check.

Figure 3:
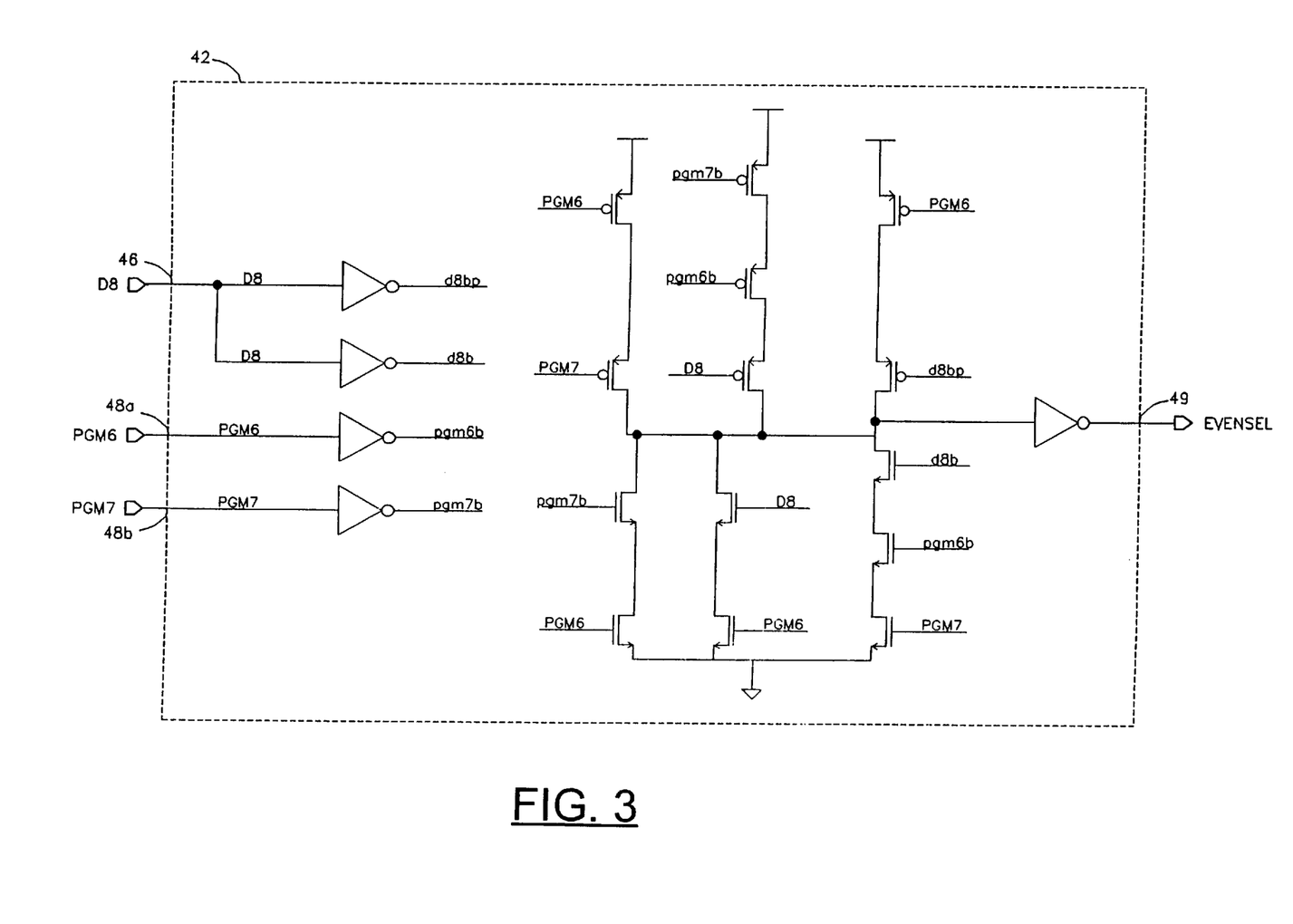
FIG. 3 is a circuit diagram of the SelectGen block shown in FIG. 2.

Referring to FIG. 3, the SelectGen block 42 is shown in greater detail. The SelectGen block 42 is shown having an input 46, an output 49, an input 48a and an input 48b which may represent the two bits (i.e., <6:7>) of the three-bit parity configuration signal PGM received at the input 48. The input 48a receives a signal PGM6 while the input 48b receives a signal PGM7. The signal PGM6 and the signal PGM7 correspond to the column headings illustrated in TABLE 1. The SelectGen block 42 comprises an array of inverters and transistors configured to produce the signal EVENSEL presented at the output 49. The input 46 represents the bit <8> received from the bus 34.

Figure 4:
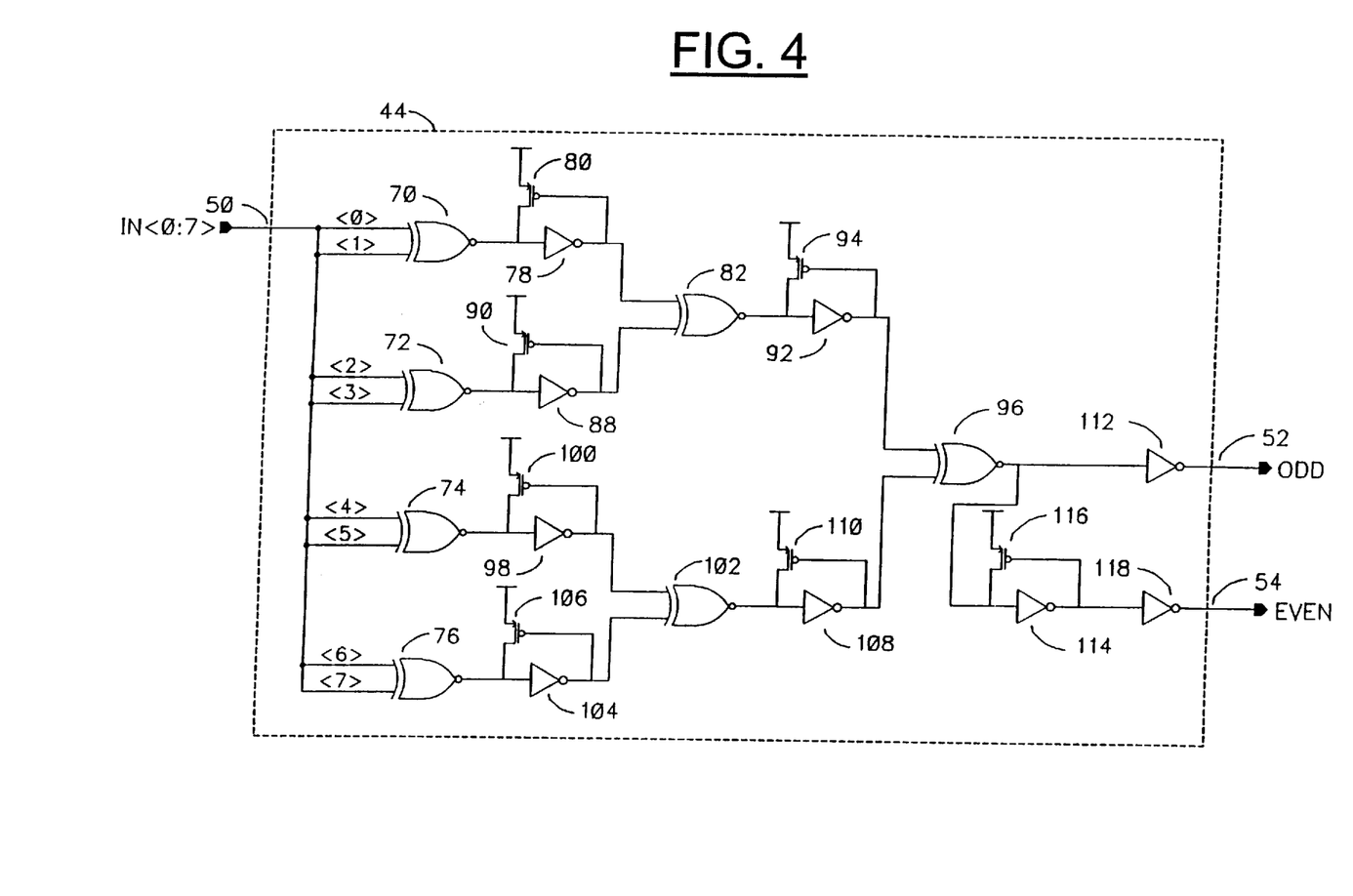
FIG. 4 is a circuit diagram of the ParityGen block shown in FIG. 2.

Referring to FIG. 4, the ParityGen block 44 is shown in greater detail. The ParityGen block 44 generally comprises an exclusive NOR gate (XNOR) 70, an XNOR gate 72, an XNOR gate 74 and an XNOR gate 76 which each may receive two bits of the 8-bit signal received at the input 50. The output of the XNOR gate 70 is generally presented to both an input of an inverter 78 as well as the drain of a transistor 80. The output of the inverter 78 is generally presented to the gate of the transistor 80 as well as to a first input of an XNOR gate 82. Similarly, the output of the XNOR gate 72 is generally presented to both an inverter 88 as well as to the drain of a transistor 90. The output of the inverter 88 is generally presented to the gate of the transistor 90 as well as to a second input of the XNOR gate 82. The sources of the transistors 80 and 90 are generally connected to an input supply voltage (not shown). The output of the XNOR gate 82 is generally presented to both an inverter 92 as well as to the drain of a transistor 94. The output of the inverter 92 is generally connected to both the gate of the transistor 94 as well as to a first input of an XNOR gate 96.

The output of the XNOR gate 74 is generally presented to both an inverter 98 as well as to the drain of a transistor 100. The output of the inverter 98 is generally presented to both the gate of the transistor 100 as well as to a first input of an XNOR gate 102. Similarly, the XNOR gate 76 generally presents an output to both an inverter 104 as well as to the drain of a transistor 106. The output of the inverter 104 is generally presented to both the gate of the transistor 106 as well as to a second input of the XNOR gate 102. The sources of the transistors 100 and 106 are generally connected to an input supply voltage (not shown). The output of the XNOR gate 102 is generally presented to both an inverter 108 as well as to the drain of a transistor 110. The output of the inverter 108 is generally presented to the gate of the transistor 110 as well as to a second input of the XNOR gate 96.

The output of the XNOR gate 96 is generally presented to an inverter 112, to an inverter 114 and the drain of a transistor 116. The output of the inverter 114 is generally presented to an inverter 118 as well as to the gate of the transistor 116. The sources of the transistors 94, 110 and 116 are generally connected to an input supply voltage (not shown). The output of the inverter 112 generally presents the signal ODD at the output 52. The output of the inverter 118 generally presents the signal EVEN at the output 54. The detailed description shown in FIG. 4 illustrates one example of implementation of the parity generation block 44. Other implementations performing a similar function may be substituted without departing from the spirit of the invention.

Figure 5:
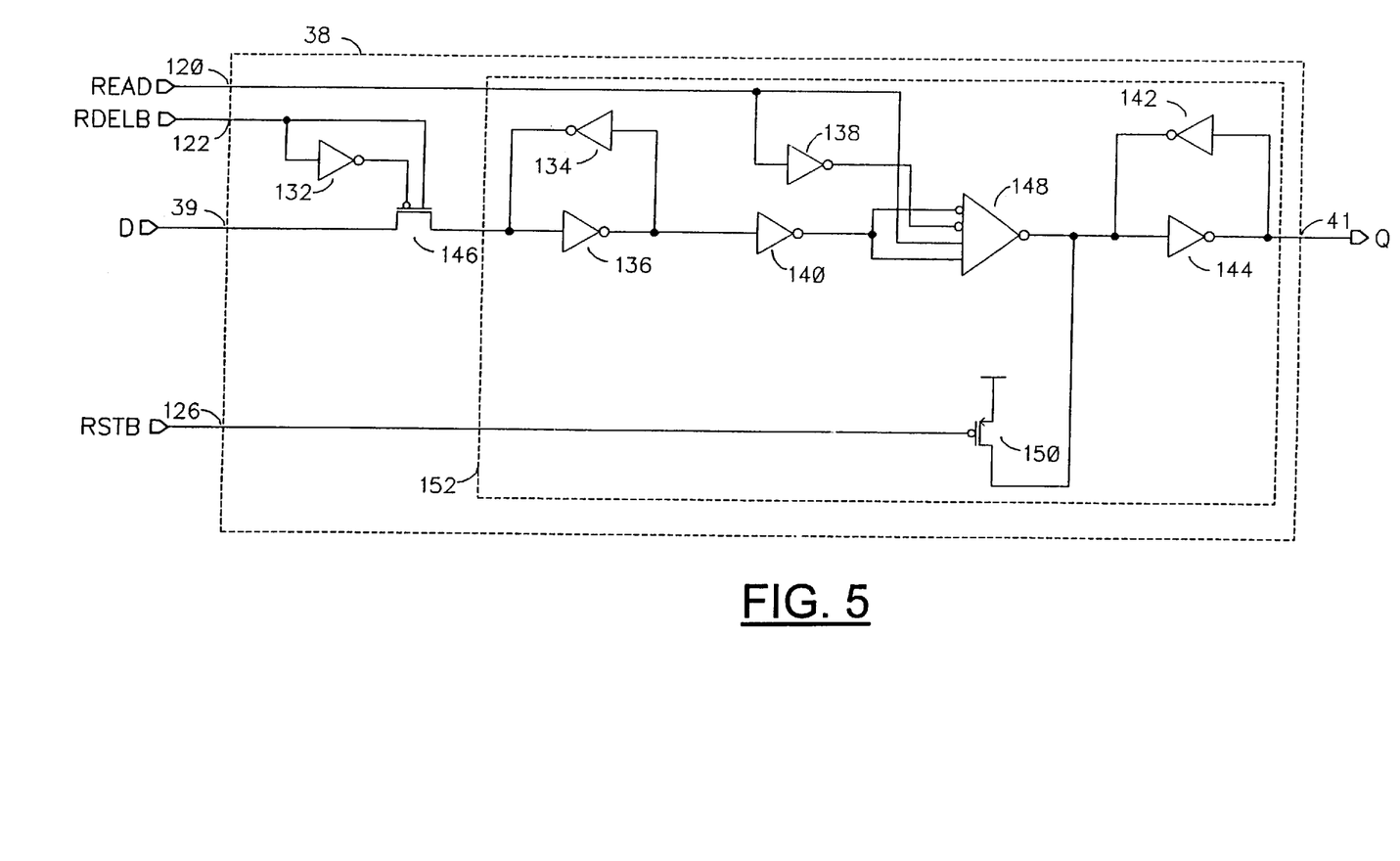
FIG. 5 is a circuit diagram of the output register block shown in FIG. 2.

Referring to FIG. 5, a circuit diagram of the output register block 38 is shown. The output register block 38 generally comprises an input 120, an input 122, an input 39 and an input 126. The output register block 38 generally presents an output 41. The output register block 38 generally comprises an inverter 132, an inverter 134, an inverter 136, an inverter 138, an inverter 140, an inverter 142, an inverter 144, a CMOS pass gate 146, an enabled inverter 148 and a transistor 150. The input 120 generally receives a signal READ representing a signal derived from the read clock (not shown). The signal READ may follow the external read clock. The input 122 generally receives a signal RDELB representing a delayed complement of the signal READ. The input 126 generally receives a signal RSTB which provides a reset function (i.e., drives each of the outputs to zero).

The CMOS pass gate 146 has a PMOS gate which generally receives the input 122 through the inverter 132 as well as a NMOS gate which generally receives the input 122. The input of the CMOS pass gate 146 generally receives the input 39. The output of the CMOS pass gate 146 is generally presented to the inverter 136 as well as to the output of inverter 134. The output of the inverter 136 is generally presented to the inverter 140 as well as to the inverter 134. The output of the inverter 134 is generally presented to the input of the inverter 136 as well as to the output of CMOS pass gate 146. The output of the inverter 140 is generally presented to a p-data input of the enabled inverter 148 as well as to a n-data input of the enabled inverter 148. The p-enabled input of the enabled inverter 148 may receive a signal from the input 120 through the inverter 138. The n-enabled input of the enabled inverter 148 may receive a signal from the input 120. The output of the enabled inverter 148 is generally presented to the inverter 144 and the drain of the transistor 150 as well as to the output of inverter 142. The output of the inverter 144 is generally presented to the output 41 as well as to the inverter 142. The output of the inverter 142 is generally connected to the input of the inverter 144 and the drain of the transistor 150 and to the output of enabled inverter 148. The source of the transistor 150 is generally connected to an input supply voltage (not shown). The gate of the transistor 150 is generally connected to the input 126. A block 152 represents the output section of the output register block 38.

Figure 6:
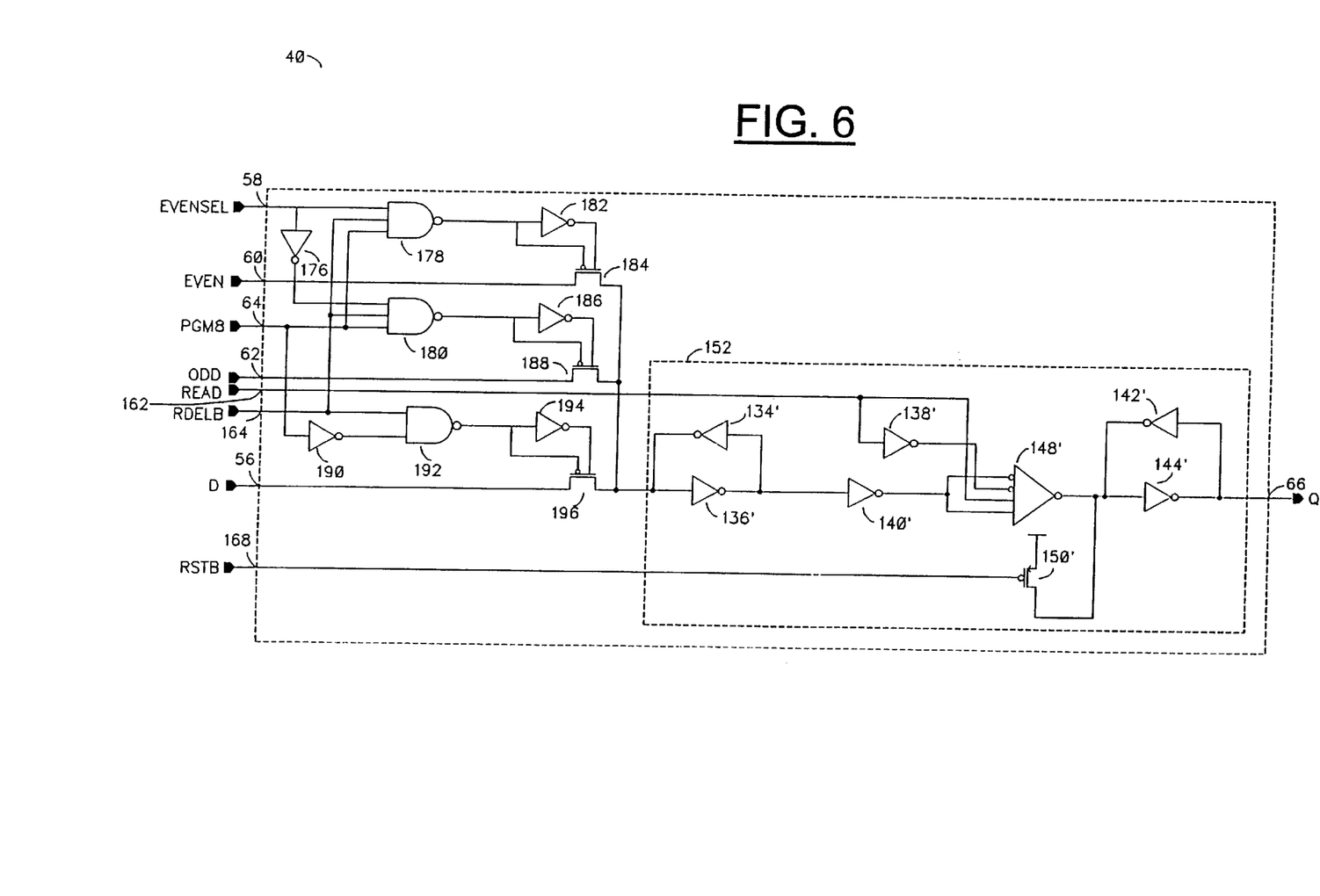
FIG. 6 is a circuit diagram of the Parity Register block shown in FIG. 2.

Referring to FIG. 6, the parity register 40 is shown in greater detail. The parity register 40 generally comprises an input 58, an input 60, an input 64, an input 62, an input 162, an input 164, an input 56, an input 168 and an output 66. The parity register 40 generally comprises an output section 152, an inverter 176, a NAND gate 178, a NAND gate 180, an inverter 182, a CMOS pass gate 184, an inverter 186, a CMOS pass gate 188, an inverter 190, a NAND gate 192, an inverter 194 and a CMOS pass gate 196. The output section 152 comprises similar components as the output section 152 of the output register 38. The input 58 generally presents a signal to a first input of the NAND gate 178 as well as to the inverter 176. The inverter 176 presents an output to a first input of the NAND gate 180. A second input of the NAND gate 178 is generally connected to the second input of the NAND gate 180, a first input of the NAND gate 192 and the input 164. The third input of the NAND gate 178 is generally connected to the third input of the NAND gate 180 and the input 64. The input 64 is generally connected to the second input of the NAND gate 192 through the inverter 190. The output of the NAND gate 178 is generally connected to the PMOS gate of the CMOS pass gate 184 as well as to the inverter 182. The output of the inverter 182 is generally connected to the NMOS gate of the CMOS pass gate 184. The input of the CMOS pass gate 184 is generally connected to the input 60. The output of the CMOS pass gate 184 is generally connected to the output of the CMOS pass gate 188, the output of the CMOS pass gate 196, and the inverter 136'. Similarly, the output of the NAND gate 180 is generally connected to the PMOS gate of the CMOS pass gate 188 as well as to the inverter 186. The output of the inverter 186 is generally connected to the NMOS gate of the CMOS pass gate 188. The input of the CMOS pass gate 188 is generally connected to the input 62. The output of the NAND gate 192 is generally connected to the PMOS gate of the CMOS pass gate 196 as well as to the inverter 194. The output of the inverter 194 is generally connected to the NMOS gate of the CMOS pass gate 196. The input of the CMOS pass gate 196 is generally connected to the input 56. The input 162 is generally connected to both the inverter 138' as well as the n-enabled input of the enabled inverter 148'. The input 168 is generally presented to the gate of the transistor 150'.

The CMOS pass gates 184, 188 and 196 work in combination with the inverters 176, 182, 186, 190 and 194 as well as the NAND gates 178, 180 and 192 to form a multiplexer. The outputs of the multiplexer are fed to the output section 152.

Figure 7:
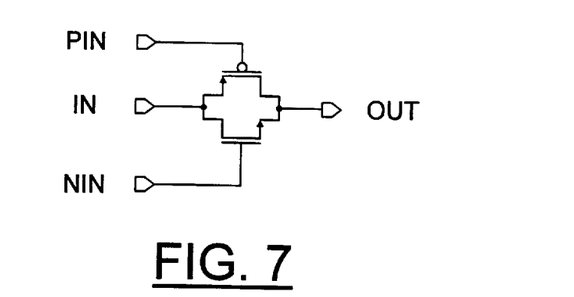
FIG. 7 is a circuit diagram of a CMOS pass gate.

Referring to FIG. 7, a CMOS pass gate is shown in greater detail. The PMOS gate input may be represented by the signal PIN while the NMOS gate input may be represented by the signal NIN. The input may be represented by the signal IN while the output may be represented by the signal OUT.

Figure 8:
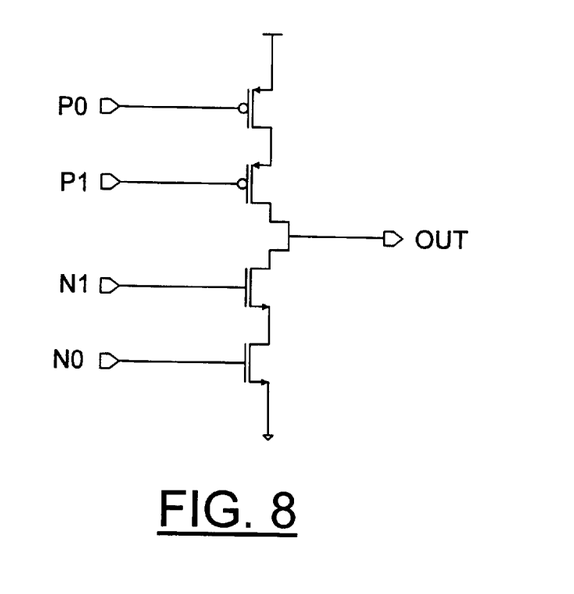
FIG. 8 is a circuit diagram of an enabled inverter.

Referring to FIG. 8, an enabled inverter is shown in greater detail. The P-data input may be represented by the signal P0, the p-enabled input may be represented by the signal P1, the n-enabled input may be represented by the signal N1 and the n-data input may be represented by the signal N0.

The schematic diagrams in FIGS. 4–8 are shown as being implemented using PMOS and NMOS transistors. Other topologies may be substituted to meet the design criteria of a particular application.

While the invention has been particularly shown and described with reference to preferred embodiments thereof, it will be understood by those skilled in the art that various changes in form and details may be made without departing from the spirit and scope of the invention.

We claim:

1. A circuit comprising:

means for receiving data;

means for storing the data received from said means for receiving data;

means for presenting the data stored in said means for storing the data on a multi-bit bus; and means for generating (i) a parity signal on one bit of said multibit bus from the data stored in said means for storing the data when said circuit is operating in a parity mode or (ii) a data bit on said one bit of said multi-bit bus when said circuit is operating in a data mode, said means for generating being positioned between said means for storing the data and said means for presenting the data, wherein said means for generating detects errors from either (i) the received data or (ii) the stored data.

2. The circuit according to claim 1 further comprising one or more devices for sensing an electrical potential in the data stored in said means for storing the data.

3. The circuit according to claim 2 wherein said devices are positioned between said means for storing data and said means for generating said output signal and between said means for storing the data and said means for presenting the data.

4. The circuit according to claim 3 wherein each of said devices comprises one or more sense amplifiers.

5. The circuit according to claim 1 wherein said means for receiving data comprises (a) one or more input pads and (b) one or more input buffers and said means for presenting the data comprises (c) one or more output pads and (d) one or more output buffers.

6. The circuit according to claim 1 wherein said means for generating and said means for presenting the data are each capable of receiving a multi-bit signal from said means for storing the data.

7. The circuit according to claim 6 further comprising means for producing error indications when the parity signal of the data stored is different from an expected parity.

8. The circuit according to claim 7 further comprising means for producing one or more parity bits.

9. The circuit according to claim 8 further comprising output signal means for producing one or more data bits.

10. The circuit according to claim 9 further comprising means for generating a configuration signal to select between (a) said parity mode, (b) said data mode or (c) any combination thereof.

11. The circuit according to claim 10 wherein said configuration signal is generated by programming during a master reset, programming a register, providing a specific programming sequence, providing a write program register cycle to dynamically change a program register, manufacturing the circuit to have a predetermined configuration signal, providing dedicated pins, or any other means to provide the configuration signal.

12. A circuit according to claim 11 wherein said means for producing error indications is capable of producing said error indications at a speed equal to or greater than the speed of said means for presenting data.

13. The circuit according the claim 1, wherein said means for storing is selected from the group consisting of first-in first-out buffers, static random access memories, dual port memories, content addressable memories.

14. The circuit according to claim 1 wherein said means for receiving data comprises (a) one or more input pads and (b) one or more input buffers, said means for presenting comprises (c) one or more sense amplifiers, (d) one or more output pads and (e) one or more output buffers, wherein each of said means for generating and said means for presenting receives a multi-bit signal from said means for storing wherein said means for generating operates in a parity mode or a data mode, said output signal represents (f) one or more error indications when said circuit is operating in said parity mode, or (g) one or more data bits when said circuit is operating in said data mode.

15. A method comprising the steps of:

(a) receiving data from an external device;

(b) storing the data received from the external device;

(c) from the data stored, indicating any errors in the data and any errors created in the storing step by presenting a parity signal on one-bit of a multi-bit bus when in a parity mode or presenting a data bit on said one bit when in a data mode; and (d) presenting the data to the external device.

16. The method according to claim 15 further comprising, between said storing and said generating steps, the step of sensing an electrical potential.

17. The method according to claim 15 wherein:

the data of step (a): (i) is received through one or more input pads from said external device and (ii) is buffered prior to being stored; and the data of step (d): (i) is presented through one or more output pads to said external device and (ii) is buffered prior to being presented to said external device.

18. The method according to claim 15 further comprising (a) checking said parity signal of the data stored, (b) providing one or more error indications when the checked parity signal is different from an expected parity, (c) generating one or more parity signals in response to said error indications, (d) operating in a data mode for producing one or more data bits or (e) any combination thereof.

19. An apparatus comprising:

a data input circuit;

a memory device capable of receiving and storing data from the data input circuit;

an output circuit capable of presenting the data stored in the memory device; and a generation circuit generating (i) a parity signal on one bit of a multi-bit bus when said circuit is in a parity mode or (ii) a data bit on said one bit of said multi-bit bus when said circuit is in a data mode, said parity bit generated from the data stored in the memory device, said generation circuit being positioned between said memory device and said output circuit, wherein said generation circuit detects errors in the data received from the data input and errors in the data stored in the memory device.

20. The apparatus according to claim 19 wherein said data input circuit comprises (a) one or more input pads and (b) one or more input buffers, said output circuit comprises (c) one or more sense amplifiers, (d) one or more output pads and (e) one or more output buffers, wherein each of said generation circuit and said output circuit receives a multi-bit signal from said memory device wherein said generation circuit operates in a parity mode or a data mode, an output signal represents (f) said errors detected when said apparatus is operating in said parity mode, or (g) one or more data bits when said apparatus is operating in said data mode.

* * * * *